March 11, 1930.  F. E. SMITH  1,749,852
CONVEYER DRIVING MECHANISM
Filed June 14, 1929
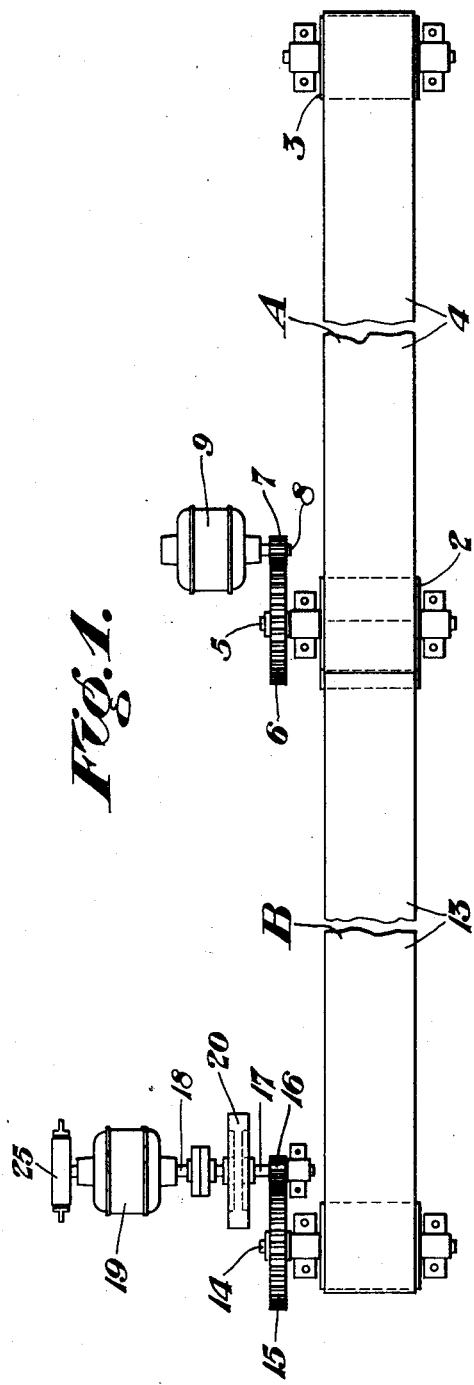
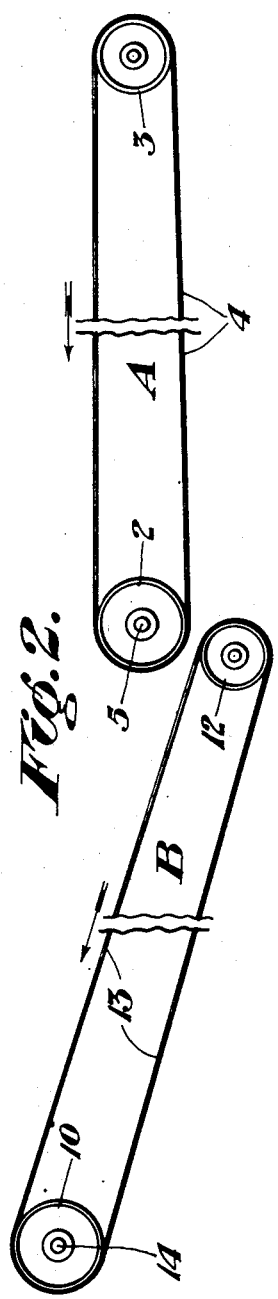
Inventor:
FRANK E. SMITH,
by: Usina & Rauber
his Attorneys.

Patented Mar. 11, 1930

1,749,852

UNITED STATES PATENT OFFICE

FRANK E. SMITH, OF SCOTTDALE, PENNSYLVANIA

CONVEYER-DRIVING MECHANISM

Application filed June 14, 1929. Serial No. 370,873.

This invention relates to conveyers and, while not limited thereto, relates more particularly to drive mechanism for continuous belt conveyer systems and has for its object the provision of means whereby a receiving conveyer unit having a greater lift than a delivery conveyer unit will be caused to operate for at least as long as the delivery conveyer unit upon failure of the power to the operating means for said system.

In the operation of conveyer systems of the continuous belt type composed of a plurality of successive units delivering one to the other, it often happens that the delivery unit will have very little or no lift at all, while the receiving unit will have a very material elevation or lift. In cases of this sort, the delivery or feeding conveyer unit, due to its low lift or no lift, will coast from fifteen to twenty seconds or even longer irrespective of the efforts to stop it, while the receiving unit, due to its greater lift, will stop in from two to three seconds. This stopping of the receiving unit prior to the delivery unit is very undesirable since it causes the delivery of a pile of the material being conveyed on the receiving conveyer unit which generally means a bad spill when the units are again started.

In the drawings:

Figure 1 is a plan view of a pair of conveyer units embodying this invention.

Figure 2 is a side elevation thereof.

Referring more particularly to the drawings, the letters A and B designate the delivery and receiving conveyer units, respectively.

The delivery unit A comprises the usual head and tail pulleys 2 and 3, respectively, and conveyer belt 4. The head pulley 2 has a shaft 5 which carries a gear 6, which gear is meshed with a pinion 7 carried by the armature shaft 8 of a drive motor 9.

The receiving conveyer unit B has a materially greater lift than the delivery unit and comprises the usual head and tail pulleys 10 and 12, respectively, and conveyer belt 13. The head pulley 10 has a shaft 14 on which is mounted a gear 15, which is meshed with a pinion 16 carried by a shaft 17. The shaft 17 is coupled to the armature shaft 18 of a motor 19 and has a fly-wheel 20 mounted thereon. The armature shaft 18 of the motor 19 is extended beyond the motor casing and is provided with a suitable solenoid brake 25 for stopping the receiving unit B.

The motors 9 and 19, gears 6 and 15, pinions 7 and 17, and the head pulleys 2 and 10 are so proportioned and combined that when power is applied to operate the motors 9 and 19 both of said conveyer units will operate at substantially the same speed. If, however, the power is cut off, due to failure or for any other reason, the receiving unit B will tend to stop several seconds before the delivery unit A due to the greater lift or inclination of the receiving unit. The fly-wheel 20, however, serves to store sufficient energy during the operation of the unit to cause said receiving unit to run for at least as long as the delivery unit, thereby preventing the piling of conveyed material from the delivery unit A onto the receiving unit B.

The solenoid brake 25 is provided for stopping the receiving unit B.

While I have shown and described one specific embodiment of my invention it will be understood that I do not wish to be limited thereto, since various modifications may be made without departing from the scope of my invention, as defined in the appended claims.

I claim:

1. In combination a delivery conveyer unit and a receiving conveyer unit having more lift than said delivery unit, means for driving both of said units at substantially the same speed, and means connected with said receiving conveyer unit for storing energy during the operation of said units whereby said receiving unit will continue in motion at least as long as said delivery unit upon failure of the power for any reason.

2. In combination a delivery belt conveyer unit and a receiving belt conveyer unit having more lift than said delivery unit, driving pulleys for said units, individual power driving means for said units adapted to drive said units at substantially the same speed, and means connected with the driving means for said receiving unit for storing energy during the operation of said units, whereby said receiving unit will continue in motion at least as long as said delivery unit upon failure of the power for any reason.

3. In combination a delivery belt conveyer unit and a receiving belt conveyer unit having more lift than said delivery unit, driving pulleys for said units, individual power driving means for said units adapted to drive said units at substantially the same speed, and a fly-wheel connected with the driving means for said receiving unit for storing energy during the operation of said units, whereby said receiving unit will continue in motion at least as long as said delivery unit upon failure of the power for any reason.

In testimony whereof, I have hereunto set my hand.

FRANK E. SMITH.